United States Patent Office 2,737,521
Patented Mar. 6, 1956

2,737,521

PROCESS OF DEHYDROCHLORINATING POLY-CHLOROALKYL CHLOROSILANES

George H. Wagner, Clarence, N. Y., assignor to Union Carbide and Carbon Corporation, a corporation of New York No Drawing. Application June 28, 1954,
Serial No. 439,893

9 Claims. (Cl. 260—448.2)

This invention relates to a process for preparing chloroalkenyl chlorosilanes from polychloroalkyl chlorosilanes. More particularly, the invention relates to an improved method for dehydrochlorinating chloroalkyl chlorosilanes whereby chloroalkenyl chlorosilanes are prepared at higher production rates, in purer form and in greater yields than by any method known heretofore.

The polychloroalkyl chlorosilanes suitable as starting materials in the preparation of chloroalkenyl chlorosilanes are those which contain a single chlorine atom bonded to the beta carbon atom of the polychloroalkyl substituent group, and a single chlorine atom bonded to an adjacent carbon atom of said group. Typical of the chloroalkyl chlorosilanes which may be dehydrochlorinated in accordance with the present invention are alpha, beta-dichloroethyl trichlorosilane; alpha, beta-dichloropropyl trichlorosilane; beta, gamma-dichloropropyl trichlorosilane; alpha, beta-dichlorobutyl trichlorosilane; alpha, beta-dichloroethyl ethyl dichlorosilane; alpha, beta-di-chloroethyl diethyl monochlorosilane and the like.

The removal of hydrogen chloride from chloroalkyl chlorosilanes is ordinarily accomplished by reacting the latter compounds with bases, for example the tertiary amines, such as quinoline or picoline, in an amount chemically equivalent to or in excess of, the hydrogen chloride to be removed. Such reactions may be illustrated by the following chemical equation representing the dehydrochlorination of alpha, beta-dichloroethyl trichlorosilane:

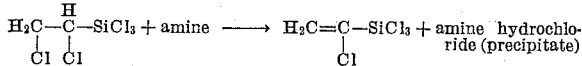

The known processes of this type relating to the removal of hydrogen chloride from chloroalkyl chlorosilanes, particularly dichloroalkyl chlorosilanes, to form chloroalkenyl chlorosilanes are attended with certain serious disadvantages. For example, the use of excess or even theoretical quantities of the required bases is almost prohibitive in cost from the commercial standpoint. Moreover, the products of such reactions have been impure and the yields low due to the high production of by-products and resinous materials. In addition it has been found that the use of excess of even theoretical quantities of the required bases creates difficulties in handling the separation of the desired chloroalkenyl product from the amine hydrochloride product. This is particularly true in operations wherein large quantities of chloroalkyl chlorosilanes are dehydrochlorinated.

The present invention provides a method whereby chloroalkenyl chlorosilanes may be produced in a pure state at production rates far greater than any obtainable heretofore, and wherein the formation of appreciable amounts of by-products of resinous materials is avoided.

In accordance with the instant invention chloroalkyl chlorisilanes containing a single chlorine atom bonded to the beta carbon atom of the chloroalkyl substituent group, and a chlorine atom bonded to an adjacent carbon atom in said group are dehydrochlorinated by heating said compounds in the presence of small amounts of an amine or amine salt at temperatures of from about 150° C. to about 210° C. and generally under reflux conditions to evolve hydrogen chloride and removing the evolved hydrogen chloride from the reaction zone.

As the starting materials employed in the process contain, in the chloroalkyl substituent group, a single chlorine atom bonded to the beta carbon atom of said group and another chlorine atom bonded to an adjacent carbon atom of the group, dehydrochlorination results in the preparation of compounds containing an olefinic unsaturation between the alpha and beta carbon atoms or between the beta and gamma carbon atoms of such substituent group. These products will also generally have a chlorine atom bonded to a carbon atom exhibiting the olefinic linkage. Thus, for example, in the dehydrochlorination of alpha, beta-dichloroethyl trichlorosilane by my process there is obtained alpha-chlorovinyl trichlorosilane. Likewise, in the dehydrochlorination of alpha, beta-dichloropropyl trichlorosilane there is obtained 1-chloro-1-propenyl trichlorosilane.

When dehydrochlorinating compounds containing chlorine atoms in the beta and gamma positions of the chloroalkyl substituent group such as beta, gamma-dichloropropyl trichlorosilane, there is obtained a mixture of 3-chloro-1-propenyl trichlorosilane and 3-chloro-2-propenyl trichlorosilane. Dehydrochlorination of chloroalkyl chlorosilanes containing one or two alkyl groups bonded to silicon in place of one or two of the chlorine atoms of a trichlorosilane is conducted in the identical manner disclosed above. Such alkyl groups do not affect the course of the reaction nor are they affected by it.

Amines suitable for use in the process are the secondary and tertiary amines, specifically the heterocyclic secondary and tertiary amines such as pyridine, quinoline, isoquinoline, acridine, piperidine and the hydrocarbyl substituted heterocyclic secondary and tertiary amines such as 2-methyl pyridine, 2-methyl, 5-ethyl pyridine, N-ethyl piperidine and the like. Also suitable for use in the process are the hydrochloride salts of the above heterocyclic secondary and tertiary amines. The amine compounds are employed in the process of this invention in an amount of from about one per cent up to about twenty percent by weight of the chlorosilane, and preferably they are employed in an amount by weight of from about two per cent to about ten per cent. When the hydrochloride salts of the above amines are employed, slightly greater amounts thereof are required.

The mechanism of the process of the invention whereby less than theoretical amounts of secondary and tertiary amines may be employed to effect dehydrochlorination of the chloroalkyl chlorosilanes is not clearly understood. However, the reaction may be illustrated by the following equation representing the dehydrochlorination of alpha, beta-dichloroethyl trichlorosilane:

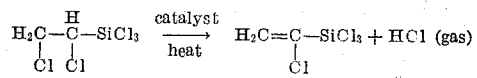

where the catalyst is a secondary or tertiary heterocyclic amine or the hydrochloride salt of such amines.

Those conditions, defined above with respect to temperature and amine concentrations, under which dichloroalkyl chlorosilanes are dehydrochlorinated are critical for the effective operation of the process. Specifically, if the process is conducted at temperatures below about 150° C. dehydrochlorination does not take place. If on the other hand the process is conducted at temperatures above about 210° C. relatively small yields of the chloroalkenyl chlorosilanes are obtained. The latter result is attributable to the fact that at such higher temperatures side reactions between the chloroalkyl chlorosilanes and amines take place and not only result in the preparation of undesirable products but also in destroying the amines for the purposes of dehydrochlorination.

With respect to the amount of the amines which are employed it has been found that concentrations thereof above about twenty per cent by weight are not conducive to the effective operation of the process. For example, when employing such compounds in higher concentrations in dehydrochlorinations conducted under reflux conditions, sublimination of amine residues occurs and crystalline white solids are found in the distilling column. On the other hand, the use of the catalysts in concentrations above about twenty per cent by weight when conducting the dehydrochlorination without reflux, that is by only applying heat, difficulties arise in the separation of the catalyst from the chloroalkenyl chlorosilane product.

One method of conducting the process of the invention involves charging a chloroalkyl chlorosilane such as alpha, beta-dichloroethyl trichlorosilane and an appropriate amount of an amine, such as quinoline, to a flask connected to a distilling column and heating the mixture to a temperature within the range referred to above. Hydrogen chloride gas is evolved from the reaction mixture, passes through the column and is vented at the head of the column and may be recovered as a valuable product of the reaction. Heating of the mixture is continued until the evolution of hydrogen chloride ceases. After heating, there remains in the flask for the specific instance referred to a mixture of alpha-chlorovinyl trichlorosilane with small amounts of quinoline and quinoline hydrochloride. Alpha-chlorovinyl trichlorosilane may be readily separated from the mixture and the remaining portion comprising quinoline and quinoline hydrochloride employed for another dehydrochlorination procedure.

The preferred embodiment of the invention comprises conducting the process under reflux conditions and providing for the removal of the products of the reaction in a single operation. This is possible as the chloroalkenyl chlorosilane product normally has a boiling point below the reflux temperature of the reaction mixture. In the practice of this embodiment of the invention, the reaction may be conducted by heating the chloroalkyl chlorosilane and amine to reflux in a flask connected to a distilling column provided with a still head and receiver. Shortly after reflux conditions are obtained, the gaseous products of the reaction mixture pass to the still head where the hydrogen chloride is vented to a hood and the gaseous chlorosilane product condensed and passed to a receiver. If desired only a portion of the chlorosilane product obtained at the still head may be passed to the receiver with the remaining portion returned to the column. By conducting the reaction in this manner the process may be made continuous by providing means for the controlled addition of the chloroalkyl chlorosilane to the reaction mixture at a rate equal to that at which the products are collected. In this manner small amounts of the amine or amine salt may be employed to dehydrochlorinate large quantities of chlorinated alkyl chlorosilanes.

The following examples are illustrative of the invention:

Example I

To a 250 cc. flask connected to a distilling column, packed twelve inches of its length with one-eighth inch glass helices, and equipped with a still head and receiver were charged 194 grams (125 cc.) of alpha, beta-dichloroethyl trichlorosilane and 5.5 grams (2.8% by weight) of quinoline. The mixture was heated to reflux (flask temperature 165–175° C.) at atmospheric pressure. Shortly after reflux conditions were established the gaseous products of the reaction passed to the still head with the hydrogen-chloride product vented to a hood and only a portion of the condensed unsaturated chlorosilane collected in the receiver with the remaining portion returned to the column. Heating was continued until the evolution of hydrogen chloride ceased. This reaction was complete within three hours and there was obtained one hundred and eight grams of alpha-chlorovinyl trichlorosilane, representing a yield of eighty-two per cent.

Example II

Employing the apparatus disclosed in Example I 194 grams (125 cc.) of alpha, beta-dichloroethyl trichlorosilane and 5.5 grams (2.8% by weight) of isoquinoline were heated to reflux (flask temperature 165–175° C.) at atmospheric pressure. Shortly after reflux conditions were established the gaseous products of the reaction passed to the still head with the hydrogen chloride product vented to a hood and only a portion of the condensed unsaturated chlorosilane collected in the receiver with the remaining portion returned to the column. Heating was continued until the evolution of hydrogen chloride ceased. This reaction was complete within two hours and there was obtained 114 grams of alpha-chlorovinyl trichlorosilane, representing a yield of 86.5 per cent.

Example III

To a 250 cc. flask connected to a distilling column, packed twelve inches of its length with one-eighth inch glass helices, and equipped with a still head and receiver were charged 194 grams (125 cc.) of alpha, beta-dichloroethyl trichlorosilane and 6 grams (3% by weight) of 2-methyl, 5-ethyl pyridine. The mixture was heated to reflux (flask temperature 165–175° C.) at atmospheric pressure. Shortly after reflux conditions were established the gaseous products of the reaction passed to the still head with the hydrogen chloride product vented to a hood and only a portion of the condensed unsaturated chlorosilane collected in the receiver with the remaining portion returned to the column. Heating was continued until the evolution of hydrogen chloride ceased. This reaction was complete within two hours and there was obtained one hundred thirty seven grams of crude alpha-chlorovinyl trichlorosilane.

Example IV

To a 250 cc. flask connected to a distilling column, packed twelve inches of its length with one-eighth inch glass helices, and equipped with a still head and receiver were charged 194 grams (125 cc.) of alpha, beta-dichloroethyl trichlorosilane and 6 grams (3 per cent by weight) of N-ethyl piperidine. The mixture was heated to reflux (flask temperature 165–175° C.) at atmospheric pressure. Shortly after reflux conditions were established the gaseous products of the reaction passed to the still head with the hydrogen chloride product vented to a hood and only a portion of the condensed unsaturated chlorosilane collected in the receiver with the remaining portion returned to the column. Heating was continued until the evolution of hydrogen chloride ceased. This reaction was complete within two hours and there was obtained one hundred and seventeen grams of alpha-chlorovinyl trichlorosilane, representing a yield of 88.5 per cent.

What is claimed is:

1. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said chloroalkyl chlorosilane with from about one per cent to about twenty per cent by weight of said chlorosilane of an amine compound taken from the group consisting of secondary and tertiary heterocyclic amines at a temperature of from about 150° C. to about 210° C. to evolve hydrogen chloride and removing said hydrogen chloride from the reaction mixture.

2. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said chloroalkyl chlorosilane with from about one per cent to about twenty per cent by weight of said chlorosilane of an amine compound taken from the group consisting of secondary and tertiary heterocyclic amine hydrochlorides at a temperature of from about 150° C. is about 210° C. to evolve hydrogen chloride and removing said hydrogen chloride from the reaction mixture.

3. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said chloroalkyl chlorosilane with from about one per cent to about twenty per cent by weight of said chlorosilane of an amine compound taken from the group consisting of secondary and tertiary heterocyclic amines at a temperature of from about 150° C. to about 210° C., under reflux conditions and removing hydrogen chloride and an unsaturated derivative of said chloroalkyl chlorosilane from the reaction mixture.

4. A process for the continuous dehydrochlorination of a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises continually feeding said chloroalkyl chlorosilane to a reaction vessel containing a mixture of said chlorosilane and from one to about twenty per cent by weight of said chlorosilane in the reaction vessel of an amine compound taken from the group consisting of secondary and tertiary heterocyclic amines, heating said mixture at a temperature of from about 150° C. to about 210° C., under reflux conditions and continually removing hydrogen chloride and an unsaturated derivative of said chloroalkyl chlorosilane from the reaction mixture.

5. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said chloroalkyl chlorosilane with from about one per cent to about twenty per cent by weight of said chlorosilane of a secondary heterocyclic amine at reflux temperatures to evolve hydrogen chloride and removing said hydrogen chloride from the reaction zone.

6. A process of dehydrochlorinating a polychloroalkyl chlorosilane in which only one of the chlorine atoms is bonded to the beta carbon atom of the polychloroalkyl group thereof with at least one chlorine atom bonded to a carbon atom adjacent to said beta carbon atom of said group, said polychloroalkyl chlorosilane being taken from the class consisting of: (a) polychloroalkyl chlorosilanes which contain only polychloroalkyl groups and chlorine atoms bonded to the silicon atom thereof, and (b) polychloroalkyl chlorosilanes which contain only polychloroalkyl groups, alkyl groups and chlorine atoms bonded to the silicon atom thereof, which comprises heating said chloroalkyl chlorosilane with from about one per cent to about twenty per cent by weight of said chlorosilane of a tertiary heterocyclic amine at reflux temperatures to evolve hydrogen chloride and removing said hydrogen chloride from the reaction zone.

7. A process of dehydrochlorinating alpha, beta-dichloroethyl trichlorosilane which comprises heating said chlorosilane with from about one to about twenty per cent by weight of said chlorosilane of quinoline at a temperature of from about 150° C. to about 210° C. under reflux conditions and removing hydrogen chloride and alpha-chlorovinyl trichlorosilane from the reaction mixture.

8. A process of dehydrochlorinating alpha, beta-dichloroethyl trichlorosilane which comprises heating said chlorosilane with from about one to about twenty per cent by weight of said chlorosilane of 2-methyl, 5-ethyl pyridine at a temperature of from about 150° C. to about 210° C. under reflux conditions and removing hydrogen chloride and alpha-chlorovinyl trichlorosilane from the reaction mixture.

9. A process of dehydrochlorinating alpha, beta-dichloroethyl trichlorosilane which comprises heating said chlorosilane with from about one to about twenty per cent by weight of said chlorosilane of N-ethyl piperidine at a temperature of from about 150° C. to about 210° C. under reflux conditions and removing hydrogen chloride and alpha-chlorovinyl trichlorosilane from the reaction mixture.

References Cited in the file of this patent

UNITED STATES PATENTS 2,512,390    Sommer    June 20, 1950

OTHER REFERENCES

Agre et al. (1): "Jour. Am. Chem. Soc.," vol. 74 (1952), pages 3895–98.

Agre et al. (2): "Jour. Am. Chem. Soc.," vol. 74 (1952), pages 3899–3902.